United States Patent
Teran et al.

(10) Patent No.: US 6,638,757 B1
(45) Date of Patent: Oct. 28, 2003

(54) BIOLOGICAL DIGESTION OF ANIMAL CARCASSES

(75) Inventors: Alfredo J. Teran, Cape Canaveral, FL (US); W. Todd Willoughby, Cape Canaveral, FL (US); Richard G. Wood, Cape Canaveral, FL (US)

(73) Assignee: Agrimond, L.L.C., Cape Canaveral, FL (US)

( * ) Notice: Subject to any disclaimer, the term of this patent is extended or adjusted under 35 U.S.C. 154(b) by 0 days.

(21) Appl. No.: 10/055,605

(22) Filed: Jan. 23, 2002

Related U.S. Application Data

(62) Division of application No. 09/471,955, filed on Dec. 22, 1999, now Pat. No. 6,350,608.

(51) Int. Cl.[7] .............................. C12S 3/00; C05F 1/00
(52) U.S. Cl. ................................ 435/267; 71/9; 71/15; 210/620; 241/1; 241/30
(58) Field of Search ................................ 435/262, 245, 435/267; 210/608–613, 620; 241/1, 5, 30; 71/9, 15

(56) References Cited

U.S. PATENT DOCUMENTS

| | | | | |
|---|---|---|---|---|
| 3,429,806 A | | 2/1969 | Carter et al. ................... 210/3 |
| 3,462,275 A | * | 8/1969 | Bellamy | |
| 3,778,233 A | | 12/1973 | Blough et al. ............. 23/259.1 |
| 3,961,078 A | * | 6/1976 | Stitt | |
| 3,997,437 A | | 12/1976 | Prince et al. ................... 210/4 |
| 4,009,100 A | | 2/1977 | Hess et al. .................... 210/14 |
| 4,053,394 A | | 10/1977 | Fisk ............... 210/8 |
| 4,225,381 A | | 9/1980 | Ishikawa et al. ............. 162/51 |
| 4,259,361 A | | 3/1981 | Procter ..................... 426/285 |
| 4,391,887 A | * | 7/1983 | Baumgarten et al. | |
| 5,076,504 A | * | 12/1991 | Young | |
| 5,162,016 A | * | 11/1992 | Malloy ...................... 452/149 |
| 5,206,169 A | | 4/1993 | Bland ....................... 435/284 |
| 5,323,969 A | * | 6/1994 | Mendenhall et al. .......... 241/1 |
| 5,405,554 A | * | 4/1995 | Neff et al. ................... 516/21 |
| 5,423,988 A | | 6/1995 | Yamasaki et al. .......... 210/611 |
| 5,545,325 A | | 8/1996 | Hsu et al. ................. 210/605 |
| 5,651,891 A | | 7/1997 | Molof et al. .............. 210/605 |
| 5,853,588 A | | 12/1998 | Molof et al. .............. 210/605 |
| 5,954,964 A | * | 9/1999 | Nielsen et al. ............ 210/609 |
| 6,039,874 A | | 3/2000 | Teran et al. .............. 210/605 |
| 6,193,889 B1 | | 2/2001 | Teran et al. ................ 210/609 |

FOREIGN PATENT DOCUMENTS

| | | | | |
|---|---|---|---|---|
| CA | 2195473 | | 1/1997 | |
| CA | 2195473 A1 | * | 7/1998 | |
| CH | 690957 A5 | | 12/1978 | |
| CH | 690957 A | * | 3/2001 | |
| DE | 2922828 A1 | * | 12/1980 | ............. C02F/3/12 |
| DE | 3714677 A1 | * | 11/1988 | ............. A22B/5/00 |
| DE | 3841928 A1 | * | 6/1990 | ............. A23K/1/10 |
| DE | 19623163 A1 | * | 12/1996 | ............. C12P/5/02 |
| GB | 1 489 592 A | * | 10/1977 | |
| JP | 58-99190 A | * | 6/1983 | |

OTHER PUBLICATIONS

Neumann et al. CAPLUS Abstract No. 1967:40576 of 'Activated sludge for purification of waste waters of an animal processing plant', GWF, Gas–Wasserfach (1966), vol. 107 (40–41), pp. 1151–1155.*
OA1 Rick Brooks, "North Carolina Hurricane Damages Rise", *The Wall Street Journal*, p. A2, Sep. 21, 1999.
OA2 Florida Statute 1997, Chapter 823—Public Nusainces, p. 1708; §823.041—"Disposal of Bodies of Dead Animals; Penalty".

* cited by examiner

*Primary Examiner*—William H. Beisner
(74) *Attorney, Agent, or Firm*—Brian S. Steinberger; Law Offices of Brian S. Steinberger, P.A.

(57) ABSTRACT

A process is provided for the biological digestion of animal carcasses. First, the carcass is cut into smaller pieces with equipment that masticates, grinds or comminutes in the presence of water to create a solid-liquid mixture. The next steps include treating the solid-liquid mixture with a special blend or combination of bacteria that have been specifically cultured to digest the carcass; the mixture is subsequently aerated to form a stabilized biomass. The stabilized biomass is aerated in an open basin to further digest and liquefy the carcass, water, bacteria mixture. From the open basin, the primarily liquid waste stream is passed to a clarifying tank where the suspended solids are precipitated as sludge, thus clarifying the liquid. Sludge is removed from the clarifying chamber and the clarified liquid is either discharged or recirculated for further use in this novel process. In the preferred embodiment of the invention, technology known as hydrolaze is used to masticate, comminute or pulverize the carcass.

12 Claims, 3 Drawing Sheets

COD reduction after settling without polymer, with polymer, and filtration.

1- Raw Waste
2- Supernatant (no polymer)
3- Supernatant (with polymer)
4- Supernatant after filtration

BIOLOGICAL DIGESTION OF ANIMAL CARCASSES

This is a Divisional of application Ser. No. 09/471,955 filed Dec. 22, 1999, now U.S. Pat No. 6,350,608.

BACKGROUND AND PRIOR ART

As the human habitat expands and as more and more animals become domesticated or intertwined in the human environment, people take on the responsibility of disposing of animals that die. Animal deaths may be due to predators desire for foodstuff, disease, natural causes, or natural disasters, such as the recent Hurricane Floyd in North Carolina where state officials estimated that more than 100,000 hogs drowned in the deluge, which also killed one million chickens and turkeys (*The Wall Street Journal*, Tuesday, Sep. 21, 1999, page A2). Collecting, handling, transporting and disposing of dead animals are difficult and costly, since the carcasses soon become offensive and putrescible if left to decay by natural processes. Our world needs an inexpensive, ecologically safe process for disposing of dead animal carcasses.

Various means of disposing of animal carcasses are currently used. In North Carolina, *The Wall Street Journal*, supra, reports that incinerators will be brought in to dispose of the carcasses of dead farm animals, contributing to a "smelly, stinky mess." Florida statute 823.041, mandates that the bodies of dead animals be disposed of by burning or burying at least 2 feet below the surface of the ground; or disposed of by rendering companies licensed to do business in the state.

Furthermore, it is taught in U.S. Pat. No. 3,429,806 that meatpacking waste, including blood, is disposed of through a series of three stabilization ponds and one aeration pond producing a discharge stream suitable for use as a soil conditioner. This elaborate system requires treatment for 10 days in each stabilization pond and 5 days in the aeration pond. Thus the process is not only costly but time consuming. Aerobic liquid composting of animal waste is disclosed in U.S. Pat. No. 3,778,233; a rotating shaft and propeller induces air into liquefied animal waste. U.S. Pat. No. 5,206,169 teaches a composting system with increased ventilation and solar panels to provide heat of decomposition and evaporation of moisture that converts animal carcasses to carbon dioxide gas, water vapor and stabilized compost consisting of nitrogen, phosphorus, potassium and calcium. U.S. Pat. No. 3,997,437 uses an aerator which shears the solid particles while simultaneously adding oxygen to sludge being treated and recirculated for an extended period of time. Aeration is used primarily to digest sludge. U.S. Pat. No. 4,009,100 oxygenates a mixture of waste water and activated sludge which is agitated to avoid settling using a water jet either at surface or just below the surface. U.S. Pat. No. 4,053,394 teaches the odorless recycling of raw sewage liquor treated with aerobic bacteria, air, oxygen, ozone, or a blend thereof to provide pure water. U.S. Pat. No. 5,423,988 discloses a waste treatment process with microorganisms from household waste to eliminate the need for an activated charcoal absorption tower.

More recently, U.S. Pat. Nos. 5,545,325; 5,651,891 and 5,853,588 disclose wastewater treatment processes which combine aerobic, anoxic and anaerobic treatment zones followed by a final clarification or settling step using a mechanical means or chemical means, such as a polymeric material to clarify the final effluent. Such multiple stage treatment processes are costly to build and operate, although purportedly less time is required for production of purified wastewater, e.g., days instead of months. Nonetheless, the cost of such customized construction would be a deterrent in reaching the desired goal of removing animal carcasses in an effort to cleanup the environment.

The waste disposal industry is still seeking an inexpensive, ecologically safe method for disposing of animal carcasses. The variety of disposal methods offered is, to some extent, evidence that none is without disadvantage. A more optimum, inexpensive solution for animal carcass disposal without noxious odors.

SUMMARY OF THE INVENTION

The first objective of the present invention is to provide a novel, inexpensive, on-site disposal process for animal carcasses.

The second objective of this invention is to provide a system for the disposal of animal carcasses in which space age technology, known as HYDROLAZE, is utilized in the disintegration/comminuting of a carcass.

The third objective of this invention is to provide a system for the disposal of dead animals that utilizes a primary aeration tank and a secondary aeration tank for the complete digestion and liquefication of carcasses.

The fourth objective of this invention is to provide a system for the disposal of animal carcasses such that in the primary aeration tank a unique blend of bacteria is employed to efficiently digest the animal carcass.

The fifth objective of this invention is to provide a system for the disposal of animal carcasses that produces a clarified liquid that is reusable in the system as the liquid supply for the comminuting and pulverizing animal carcasses.

The sixth objective of this invention is to provide a system for the disposal of animal carcasses that produces a clarified liquid that is suitable for further treatment and subsequent safe return to the environment.

The seventh objective of the present invention is to provide a system for the disposal of animal carcasses that eliminates noxious processing odors.

A preferred embodiment of the invention consists of the features of construction which are illustrated in FIGS. 1–3, wherein animal carcasses are processed through five units, including: 1. Comminuting/pulverizing chamber, 2. primary aeration tank; 3. secondary aeration tank; 4. clarifying tank and 5. a final disposal/reuse tank. The operating procedures and devices are hereinafter described in detail and the scope of which will be indicated in the appended claims.

Further objects and advantages of this invention will be apparent from the following detailed description of a presently preferred embodiment which is illustrated schematically in the accompanying drawings.

DESCRIPTION OF THE PREFERRED EMBODIMENT

Before explaining the disclosed embodiment of the present invention in detail it is to be understood that the invention is not limited in its application to the details of the particular arrangement shown since the invention is capable of other embodiments. Also, the terminology used herein is for the purpose of description and not of limitation.

The present invention is particularly described with respect to disposal of the carcasses of dead hogs, but it should be apparent to those skilled in the art that the teachings herein have other applications; for instance to the disposal of animal carcasses including, but not limited to, equine, bovine or marine animals, goat, sheep, swine, dog, cat, poultry or other beast or bird.

The present invention can also be used to dispose of animals whose deaths are due to disease or infection; however, added precautions, including sterilization or disinfection can be included since the aerobically digested water and solids may contain pathogenic organisms. The end products of this process, namely sludge and clarified water, may be treated with disinfecting agents such as ozone, heat, phenols, alcohols, strong acids or alkalies, and halogens which cause coagulation and denaturing of cell protein. Direct sunlight, ultraviolet rays, or ionizing radiation destroys pathogens. Chlorination, which has the undesirable by product of trihalomethane in certain applications, is the most frequently used disinfectant. With greater attention to control and dichlorination, it is relatively inexpensive, readily applied and controlled, and can be monitored by a simple and quick test. Thus, by employing a sterilization or disinfection step before the digested carcass end products are discharged, diseased animal carcasses are advantageously disposed of by this system.

Figure 1:
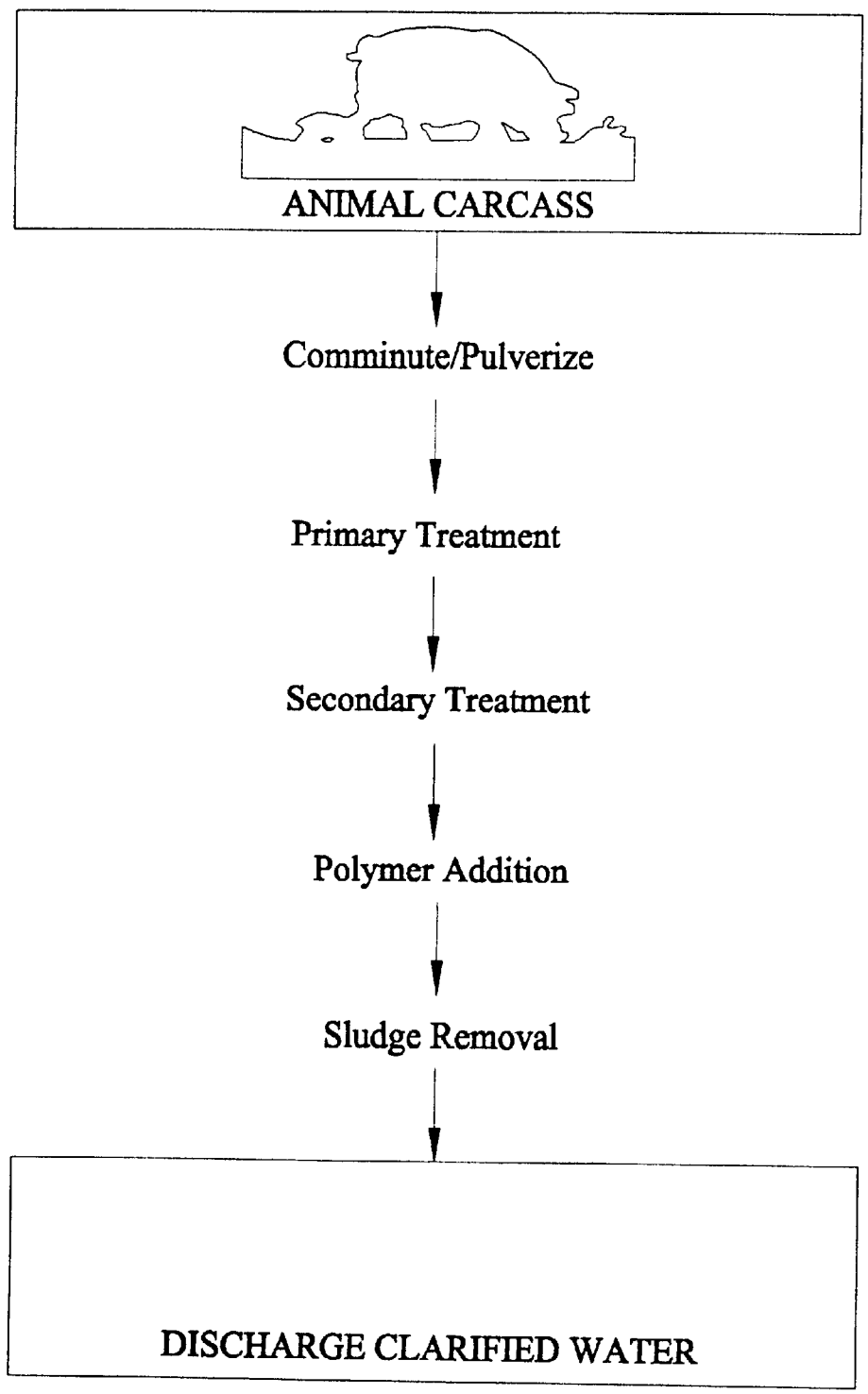
FIG. 1 is a flow chart of the process for disposing of animal carcasses.
Figure 2:
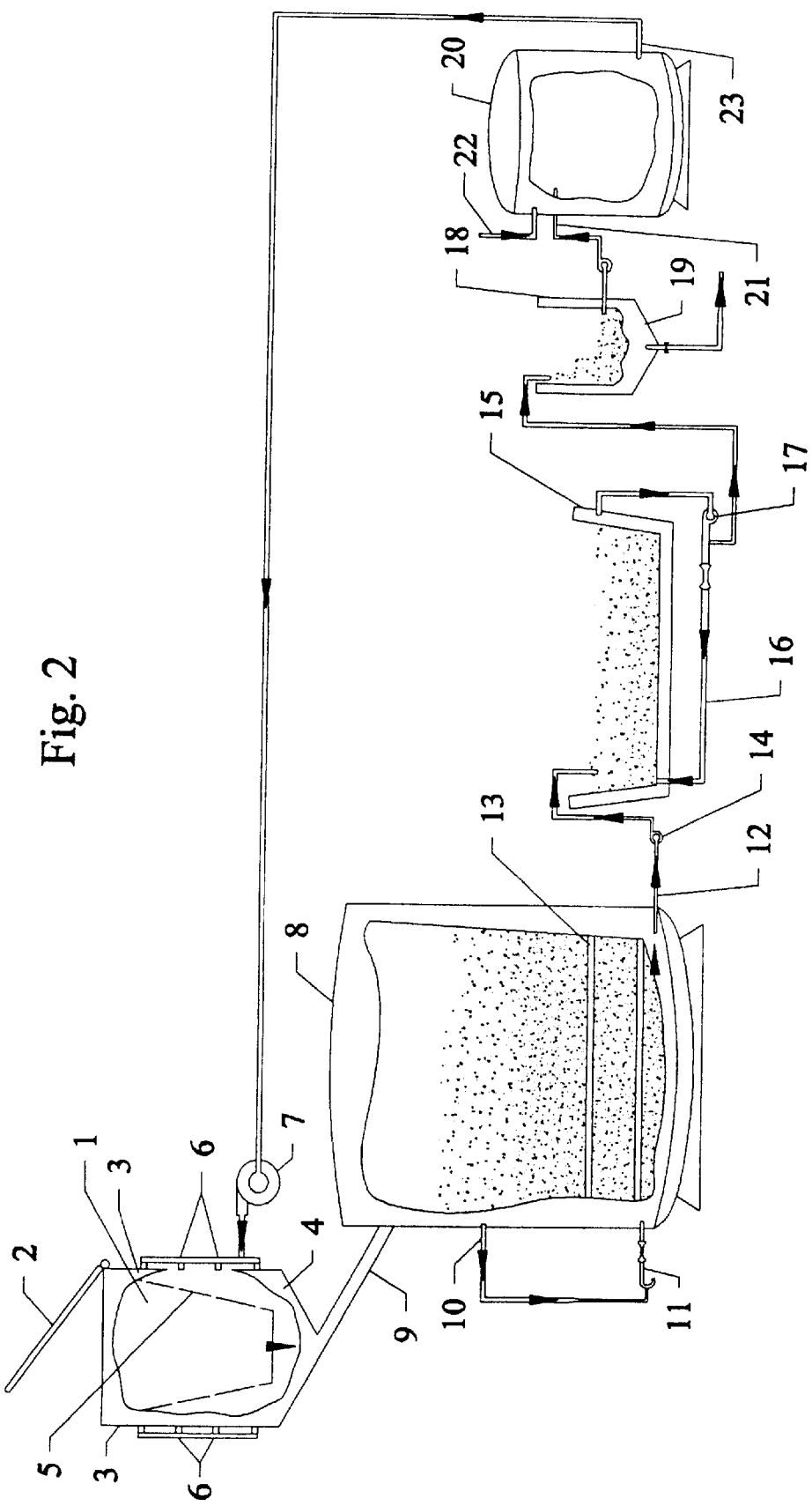
FIG. 2 is an illustrative cross-sectional view of a processing facility for the present invention.

Referring to FIGS. 1 and 2, each operating procedure and device used is listed below for further details.

Unit 1. Hydrolaze chamber. The dead hogs are placed in an enclosed chamber (1) wherein the top side consists of a hinged lid (2), with two vertical sides (3) and a bottom wall (4) housing a wide mesh basket (5); positioned along the vertical sides are rotatable spray nozzles(6) that are integrally connected to a high pressure pump (7) through which fluid is pumped. Thus, when fluid flow and pump are activated, the animal carcass can be cut into approximately 10.25 cm to approximately 15.4 cm (4 to 6 inch) pieces in a matter of seconds and converted to a mixture of liquid-solid organic material, suitable for further processing in the aerobic treatment tanks. The action by the pressurized fluid and nozzle configuration is designated herein as hydrolaze.

The effective range of fluid pressure exiting the nozzles can be in a range between 9,000 pounds per square inch to approximately 15,000 pounds per square inch. This action by the pressurized fluid and nozzle configuration is designated herein as hydrolaze.

The term "hydrolaze" as described above and shown in FIG. 2, shall mean water or any water-containing fluid fed through a high pressure nozzle such that the water performs like a laser cutting tool; an example is described later. The hydrolaze consists of one or more high pressure pumps and nozzles which can deliver water at pressures ranging from approximately 9,000 pounds per square inch (psi) to approximately 15,000 pounds per square inch (psi). The water is delivered from the pumps through high-pressure hoses to the nozzles which then direct the water towards the carcass. The nozzles are designed to provide a water stream less than five millimeters in diameter. The combination of high pressure and the "pinpoint" stream of water results in a concentrated force in a very small area which will easily cut through the skin and bone of the animal carcass. The nozzles are both fixed and oscillating to ensure complete coverage of the interior of the pulverizing chamber (Unit 1) and complete mastication of the animal carcass. The water used can be recycled water carrying the cultured bacteria from the previous treatment cycle and thus the bacteria can begin the digestion process in the pulverizing chamber. The effective range of fluid pressure exiting the nozzles can be in a range between approximately 9,000 psi and 15,000 psi.

The interior of the chamber contains a steel mesh with openings from approximately 10.25 centimeters (4 inches) to approximately 15.4 centimeters (6 inches) square. This creates a basket which holds the carcass and prevents further processing of pieces larger than the mesh openings. The result is a more homogenous mix of animal carcass, water and bacteria which will speed up the digestion process. Thus, the hydrolaze pulverized carcass is treated to form a solid-liquid mixture suitable for processing in the primary aeration tank (Unit 2).

Unit 2. The Primary Aeration Tank is a fully enclosed chamber(8) having three inlets; one for receiving the mixture from Unit 1 (9), another for introduction of the bacterial culture(10) and a third inlet for air (11) One outlet (12) is positioned at the bottom of the tank to permit removal of the aerated mixture from Unit 2. The interior of the chamber contains a small mesh grating (13) which retains the large solids in the solid-liquid mixture from Unit 1 in a position for prolonged contact with the bacterial culture that is introduced. Bacteria and a combination of bacteria referred to as a special blend of bacteria are introduced above the mesh grating. The special blend of bacteria comprises a culture of the most effective bacteria for digesting the type of animal waste being processed. Cultured bacteria are fed into the aerobic digestion chamber in large supply, during the initial start up of the process. The ratio of bacteria to waste water in the system can be from approximately 1 part bacteria to approximately 10,000 parts waste water. For example, during the start up of the system, typically one gallof of concentrated and cultured bacteria are used for each 10,000 gallons of waste water. The optimum amount of bacteria is dependent on the purity of the culture and the concentration of the bacteria in the slurry. Subsequently, after a stable biomass is created, maintenance doses are used. Maintenance doses can be approximately one fourth of the initial start up amount; e.g., ¼ part bacteria to approximately 10,000 parts waste water in the system. The stabilized iomass will continue to generate and become self-sustaining if a constant food source is supplied. Thus, an additional benefit of the present invention is a system that will function with minimal maintenance relying mainly on the natural digestion of animal carcasses with non-pathogenic bacteria.

When processing occurs at atmospheric pressure and an outside temperature between 15° C. and 26° C. (59° F. and 78.8° F.) there is no need to control the temperature. Heat is also generated during the aerobic digestion of the animal carcass. It should be noted that a temperature below 15° C. causes the reaction to take place much slower. A temperature above 26° C. is not desirable because helpful bacteria may be killed resulting in slower digestion. The bacteria themselves can alter the temperature. In cold climates, the temperature in an active basin can be as much as 10° C. above the outside air temperature. Also, while higher temperatures normally found in the summer months will slow down the bacterial activity, the system does not have any significant bacteria loss until the water temperature exceeds 32° C. (89.6° F.). Feeding more makeup water and removing more treated water during the process can reduce water temperature during the warm months.

Air is introduced below the mesh grating to augment the aerobic digestion of the carcass by a special blend of bacteria introduced above the mesh grating. Air increases the speed of digestion thereby creating a stable, primarily liquid, biomass. When a stabilized biomass was created, sludge began to build up in the form of suspended solids. Dissolved oxygen levels in the tank began to rise, indicating the biomass had stabilized. The liquid in Unit 2 was them pumped to Unit 3. The pump (14) used in this step is an industrial pump having a minimum flow rate of 500 gallons per minute. A suitable pump is manufactured and distributed by Goulds Pumps, Inc. 240 Fall Street, Seneca Falls, N.Y. The size and type of pump can be selected according to the flow rate desired.

Unit 3. The Secondary Aeration Tank is an open basin (1) which receives the liquid from Unit 2 containing bacteria which tend to stay with the liquid. Here the liquid is treated with air that is introduced at the bottom of the basin (16). Although other sources of oxygen may be used to directly aerate the bacteria it is most economical to use air which is 21% oxygen. Further digestion of the waste stream occurs producing a mixture which varies in color depending on the type of animal being consumed, typically the color was a yellowish tan. A frothy mixture producing a head of foam of 10.25 centimeters (4 inches) to approximately 15.4 centimeters (6 inches) indicated an active group of bacteria. There were areas in the mixture void of foam where the water was moving too rapidly for the foam to buildup. There was no odor detectable even when within a foot of the mixture. No clumps or solids were visible although there may have been some near the bottom of the basin. Any solids remaining in the mix were eventually consumed. The aerated material in Unit 3 is now pumped via mechanical means (17) to a conical settling tank (Unit 4).

Unit 4. In the Conical Settling tank (18) about 50 parts per million (ppm) of a commercially available polymer, such as Agrimond Poly-Clear 100, which is chemically named [poly (diallyldimethylammonium chloride)] was added to clarify the waste stream. It is understood that the amount and type of polymer may vary depending on the type of mixture and the amount of solids in the mix. The polymer encourages particles to clump together and precipitate as sludge (19). The sludge resembles a thick soupy mixture and is drained away to drying beds where natural evaporation of moisture occurs. The clarified liquid portion of the waste stream is pumped to an in-system supply tank (20) which is used to supply fluid to the high pressure pump and nozzles used in Unit 1 (Hydrolaze chamber). Alternatively, water can be returned safely to the environment if treated to meet environmental standards. By using the water in a closed loop for this system, two advantages are gained. First, the hassle of obtaining a permit for returning the water to the environment is omitted. Second, some of the effective bacteria which has been cultured for the advantageous aeration of this particular organic material is returned to the system for further use in disposing of animal carcasses.

Unit 5. Hydrolaze Supply tank (20) is an enclosed chamber having two inlets; one inlet (21) receives the clarified liquid from Unit 4 and another inlet (22) receives make-up water, such as well water, to make up for losses from evaporation, drift, removal of solids and discharge to the aerobic treatment basin (15) The make-up water can be supplied from any source of potable water. The outlet flow (22) is under low pressure (e.g., about 30 psi to about 40 psi) and if recirculated in this disposal system, is fed to the high pressure pump and nozzles to comminute or pulverize the animal carcasses.

Alternatively, as discussed earlier, the water from Unit 5 can be returned safely to the environment; additional processing can be done to obtain the necessary permits and to meet local environmental standards.

DESCRIPTION OF ANOTHER EMBODIMENT

The process of the present invention as shown in 'FIG. 1 could be accomplished as described above in the preferred embodiment if a standard commercial meat-mincing machine is used instead of the Hydrolaze unit to comminute or pulverize the animal carcass. For esample, a commercially available grinder such as one manufactured by JWL Environmental, model "Muffin Monster" could pulverize the complete animal carcass prior to digestion. Whole animals or animal parts or viscera or organs or bones, or combinations of these materials could be passed through hog breaker or prebreaker. These are heavy-duty machines capable of breaking up animal bone and other tissues and are common to the rendering industry. During the pulverization of the carcass, water can be added to create a solid-liquid mixture suitable for processing in the primary aeration tank (Unit 2). Subsequent processing of the animal carcass continues in Units 2 through as disclosed above in the preferred embodiment.

EXAMPLE

Testing of the process was conducted at facilities in Cape Canaveral, Fla. between March 1999 and July 1999.

To simulate the process, five pounds of ground pork were added to 50 gallons of tap water in a small open basin. 500 ml of Type P bacteria were added to the mix. The simulated wastewater was mixed in an 80 gallon open top plastic reservoir. Wastewater was taken from the bottom of the reservoir, pumped through the venturi to provide sufficient aeration, and returned to the reservoir at an angle for better mixing and circular motion. It was determined that each pound of meat has an equivalent of an average of 750 mg/L of Chemical Oxygen Demand once it gets dissolved in 50 gallons of water.

COD is a measurement of the total amount of organic matter in a waste stream. The COD measurement in this example indicates the meat from pork has a high COD primarily resulting from the protein and fat content. The 750 mg/l COD/lb. of meat in the initial concentration translates to a COD of 3,750 mg/l using 5 lbs. of meat, the bacteria accounted for the remaining COD balance. After processing, the final COD for 5 lbs. of meat was approximately 750 mg/l representing a 5:1 or 80% reduction in the initial COD concentration. Each step in the process contributes to the reduction of the COD concentration.

After the initial phase, the special culture of bacteria was introduced and after about one week, a sufficient biomass is established. Thereafter, ground meat was added on a regular basis (1.5 pounds every three days). At the second phase of the experiment the additional hog parts such as neck bones and feet were added. It took two days for the parts to be digested by the bacteria. Also, within the first two days, the bacteria started digesting/pitting the bones.

Figure 3:
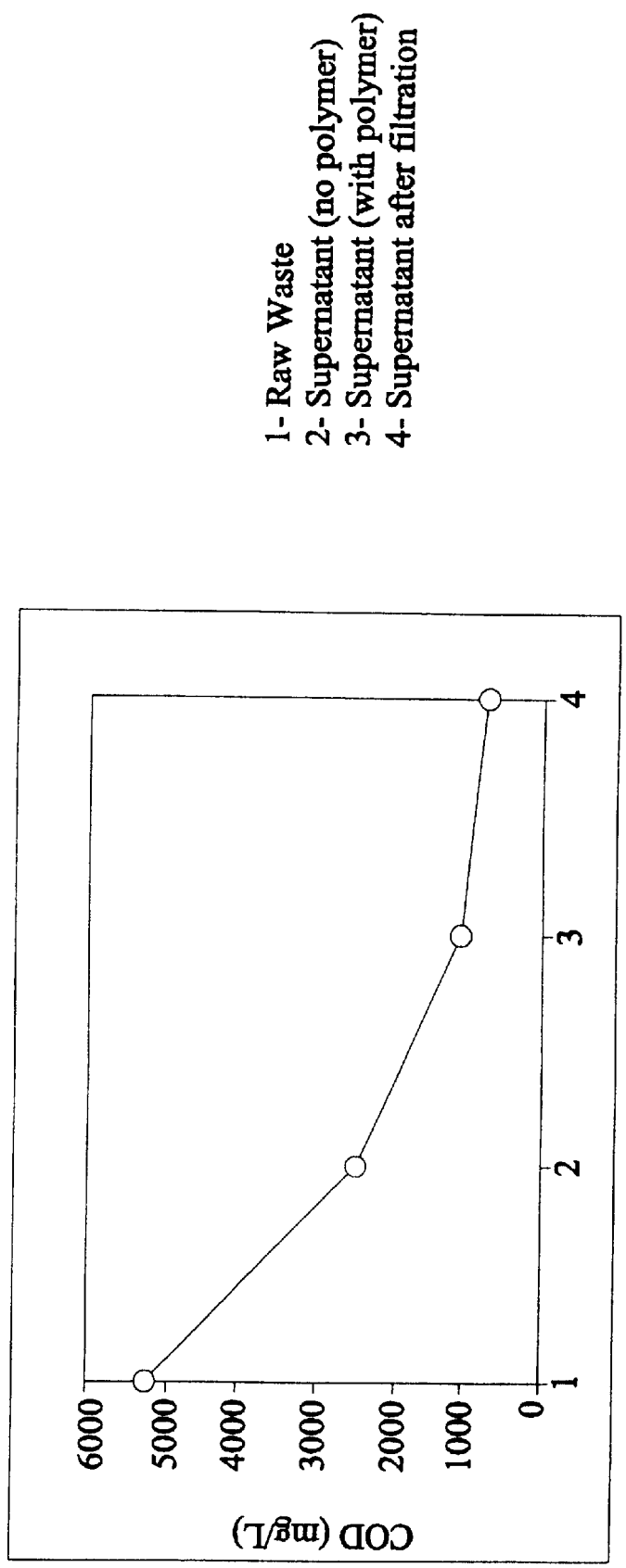
FIG. 3 is a graph showing the reduction of organic matter as measured by chemical oxygen demand (COD)during the final clarification of effluent.

For the clarification step as outlined above in Unit 4, no polymers, several different polymers at various dosages in combination with a filtration step were used to determine clarification effectiveness FIG. 3 shows chemical oxygen demand (COD) reduction after settling without polymer, with polymer, and with polymer followed by filtration.

The ultimate benefits of the proposed system were the ability to handle dead hogs on-site in an economical and environmentally friendly process. All processing is contemplated for above ground tanks and could conceivably operate as a gravity fed system except for the return of the clarified liquid to the first treatment chamber. Thus, the installation of pumping equipment is viewed as an optional means of moving the aerobically treated animal carcass from one tank or chamber to another.

A surprising and unexpected benefit in this process is the speed with which an animal carcass can be completely disposed of in the combinations of steps outlined. The key finding is the identification of the bacteria that are most effective in digesting or consuming the carcass, culturing these bacteria, and introducing them to the aeration tank with the comminuted carcass. In a matter of approximately two to approximately seven days, the carcass can be completely digested and reduced to a sludge suitable for soil conditioning when dried and a clarified liquid for further use in processing or safe return to the environment. In other words, animals that once roamed the earth are reduced to dust and water in a matter of days.

Although the preferred embodiment is applying the invention to animal carcasses, particularly, dead hogs, it is reiterated that the invention can be applied to other carcasses such as, but not limited to, mammals, marine animals, and the like.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A process for disposing of animal carcasses comprising the steps of:
   (a) depositing an animal carcass in a receptacle for mastication in the presence of a water stream to create a solid-liquid mixture;
      (bi) passing said solid-liquid mixture of step (a) to an enclosed aeration tank;
      (bii) introducing a bacteria culture and air into the tank to initiate formation of a biomass;
   (c) mixing all of the components of step (b) until the solid-liquid mixture forms a stabilized biomass with a frothy liquid consistency;
   (d) passing said liquid from step (c) into an open aeration basin for further digestion of the liquid, stabilized biomass;
   (e) passing the aerated liquid of step (d) to a clarifying tank where suspended solids precipitate as sludge; and
   (f) removing sludge from the clarifying tank of step (e) to form clarified water.

2. The process of claim 1 wherein the depositing step (a) includes the step of: comminuting the carcass with a combination of a high pressure and pin point water stream directed at the carcass.

3. The process of claim 2 wherein the water stream has a pressure of approximately 9,000 psi to approximately 15,000 psi and a diameter of less than approximately 5 millimeters.

4. The process of claim 1 wherein the clarifying tank of step (e) employs polymeric material consisting of poly (diallyldimethylammonium chloride) to cause particles to clump together enhancing formation of the sludge.

5. The process of claim 1 wherein the aerobic digestion of an animal carcass occurs over a period of approximately 2 to approximately 7 days.

6. The process of claim 1, wherein step (bii) includes the step of:
   introducing the bacteria at a ratio of approximately ¼ to approximately 1 part of the bacteria to approximately 10,000 parts waste stream.

7. The process of claim 1, further comprising the step of:
   generating an aerobic digestion in the process outdoors during an outside temperature range of approximately 15C to approximately 26C.

8. The process of claim 1 wherein the mixing step (c) includes the step of:
   producing a frothy mixture head between approximately 10.25 cm to approximately 15.4 cm to indicate an active group of the bacteria culture.

9. A process for disposing of animal carcasses, comprising the steps of:
   depositing an animal carcass in a receptacle; and
   comminuting the carcass with a water stream having a pressure of approximately 9,000 psi to approximately 15,000 psi combined with a diameter of the water stream being less than approximately 5 millimeters directed at the carcass until the carcass becomes a solid-liquid mixture.

10. The process of claim 9, further comprising the step of:
    introducing a bacteria culture at a ratio of approximately ¼ to approximately 1 part of the bacteria to approximately 10,000 parts waste stream along with air into the solid-liquid mixture to initiate formation of a biomass mixture.

11. The process of claim 9, further comprising the step of:
    generating an aerobic-digestion in the process outdoors during an outside temperature range of approximately 15C to approximately 26C.

12. The process of claim 9, further comprising the step of:
    producing a frothy mixture head in the mixture between approximately 10.25 cm to approximately 15.4 cm to indicate an active group of the bacteria culture.

* * * * *